United States Patent [19]

Epina et al.

[11] 4,331,306
[45] May 25, 1982

[54] MAGNETIC TAPE DEVICE

[75] Inventors: August P. Epina, Boulder; Richard G. Sellke, Arvada; Harold A. Lunka, Broomfield, all of Colo.

[73] Assignee: Storage Technology Corporation, Louisville, Colo.

[21] Appl. No.: 123,729

[22] Filed: Feb. 22, 1980

[51] Int. Cl.³ .............................................. G11B 15/58
[52] U.S. Cl. ..................................... 242/182; 242/185
[58] Field of Search ............................... 242/182–185, 242/188; 226/95, 97, 188; 360/71–74, 90

[56] References Cited

U.S. PATENT DOCUMENTS

| | | | |
|---|---|---|---|
| 3,826,446 | 7/1974 | Jones | 242/185 |
| 3,854,674 | 12/1974 | Herger et al. | 242/182 |
| 3,866,855 | 2/1975 | Bryer | 242/184 |
| 3,948,459 | 4/1976 | Schoeneman | 242/182 |
| 3,984,065 | 10/1976 | Bosetti et al. | 242/184 |
| 4,065,044 | 12/1977 | Painter et al. | 226/188 |
| 4,093,148 | 6/1978 | Urynowicz | 242/182 |
| 4,189,113 | 2/1980 | Epina et al. | 242/182 |

Primary Examiner—Leonard D. Christian
Attorney, Agent, or Firm—Woodcock, Washburn, Kurtz, Mackiewicz & Norris

[57] ABSTRACT

A magnetic tape drive unit for storage of digital data is disclosed which features vertically disposed supply and take-up reels, double long folded over buffer columns to permit rapid acceleration of the part of the tape in the vicinity of the magnetic head, and dual isolation pockets for additional motion control of the tape. In a preferred embodiment, the inner surfaces of the tape path are lined with glass beaded adhesive tape to prevent friction; fence posts may also be provided to prevent planar contact between the magnetic tape and the walls of the unit. A vacuum capstan is desirably used. In this way, high acceleration and tape speeds are made possible in a tape transport capable of being mounted in the industry standard 19 inch wide mounting rack.

10 Claims, 5 Drawing Figures

MAGNETIC TAPE DEVICE

FIELD OF INVENTION

The present invention relates to drives for magnetic tape, especially tape for the storage of digital data. More particularly, the present invention relates to a high speed buffered tape drive, having conventional sized reels but which can be mounted in a standard 19 inch rack configuration while providing high performance of a level previously unavailable in a drive of this type.

BACKGROUND OF THE INVENTION

It has been common practice in the digital data storage art to provide magnetic tape units for the storage of digital data. Typically, the drives used with such tapes are required to accelerate the tapes from a stop to a high speed very rapidly on demand of a processing unit. In order to achieve this, it has been the practice of the art to decouple the main mass of tape from the section in the immediate vicinity of the magnetic read/write head by means of vacuum columns.

The continued improvements in speed and size efficiency of digital computers has required that the peripheral devices such as tape memories used with such computers be concomitantly improved. Not only has the density of data recording on magnetic tape been drastically increased in the last decade, but the speeds at which the tapes are required to move and accelerate have similarly been increased by improvements in the processing units. Furthermore, it has been and remains the aim of the art to package tape drives having the highest possible capabilities into the smallest possible space. Therefore, for example, it has been a need of the art for a tape drive which can be fit into the industry-standard 19 inch rack for mounting, as is shown for example, in U.S. Pat. No. 3,866,855. However, no prior art rack mountable drive incorporates the high speeds (e.g. 125 ips) speeds of other prior art tape drives which do not fit into such a rack, such as that shown in, for example, U.S. Pat. No. 3,854,674 to Herger et al. A proposed high speed rack mounted drive which is substantially as disclosed in U.S. Pat. No. 4,093,148 to Urynowicz et al, has not been adequately reliable to solve this need.

Therefore, while rack mounted tape drives have existed in the art, and while high performance tape drives have existed in the art, no reference has shown or taught any way in which both could be combined, since the high speed drives previously available have required more front panel space for vacuum decoupling columns than was available in a 19 inch rack mountable drive.

OBJECTS OF THE INVENTION

Therefore, it is one of the objects of the present invention to provide an improved tape drive unit.

Another object of the invention is to provide an improved rack mounted tape drive unit.

Another object of the invention is to provide an improved high performance tape drive unit made small enough to fit within the industry standard 19 inch rack.

Finally, the ultimate object of the invention is to provide a tape drive capable of high speeds, up to 200 ips, high bit densities such as 6250 bpi using standard 11 inch tape reels but fitting within the industry-standard 19 inch wide storage rack.

SUMMARY OF THE INVENTION

The invention fulfills the above mentioned needs of the art and objects of the invention by its provision of a tape drive having first and second reels, disposed one above the other, and comprising first and second long vacuum buffer columns and first and second vacuum isolation pockets. The tape path is defined by air bearings and vacuum sources. It is formed in a unitary aluminum casting which is lined with glass beaded tape and is provided with fence posts to provide smooth transport of the tape along the tape path.

BRIEF DESCRIPTION OF THE DRAWINGS

The invention will be better understood if reference is made to the accompanying drawings, in which.

DESCRIPTION OF THE PREFERRED EMBODIMENTS

Figure 1:
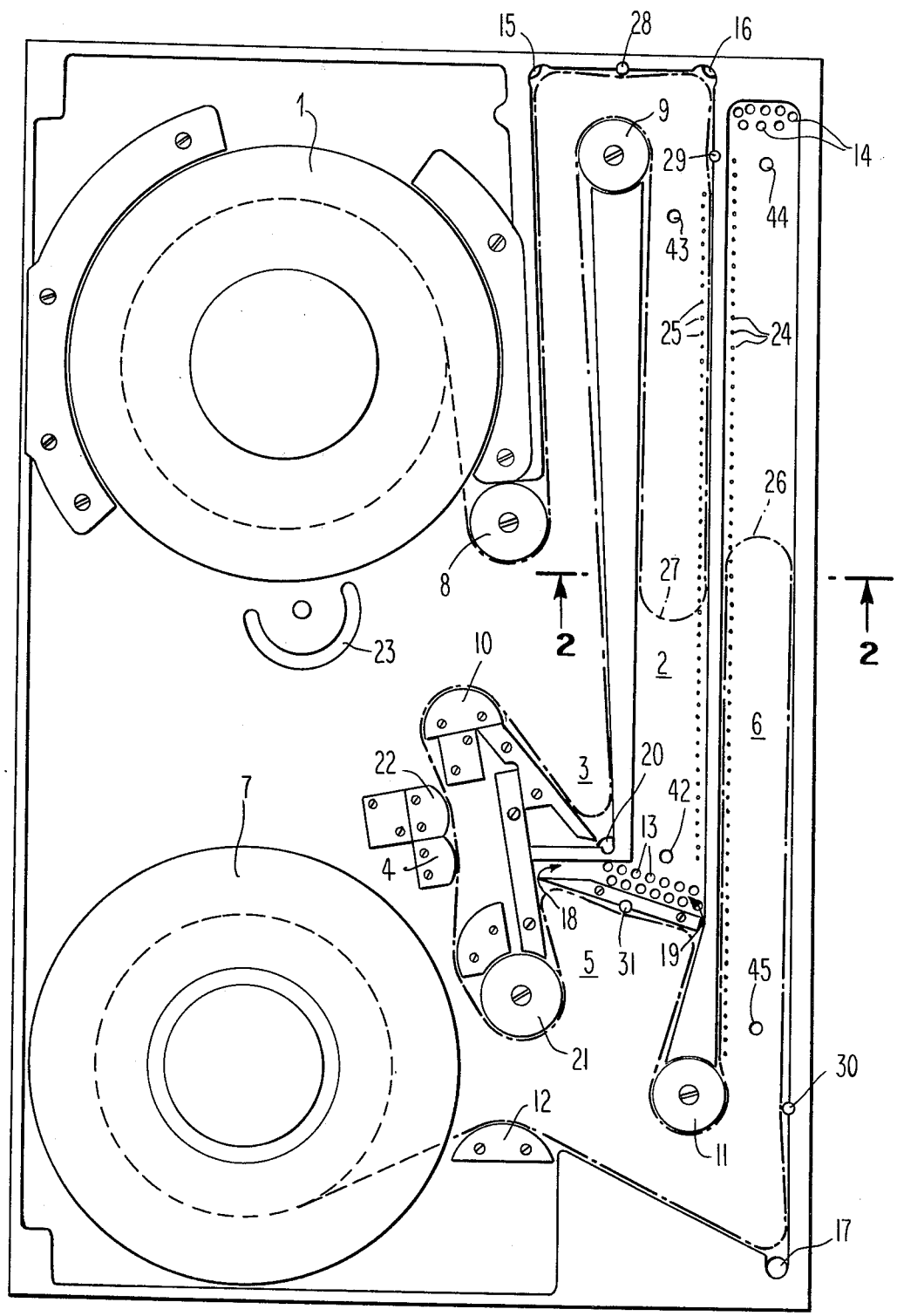
FIG. 1 represents a frontal view of the tape drive of the invention.

Referring now to FIG. 1, an overall plan view of a tape drive according to the invention is shown. The tape is supplied from a "file" reel 1 mounted on a first spindle in the upper half of the machine. The tape is threaded, as indicated by dot-dash lines, around a first long vacuum column 2, a first stubby column 3, past a read/write head indicated at 4, through a second stubby column 5, a second long buffer column 6, and onto a second or "machine" reel 7. The motion of the tape is kept as frictionless as possible by liberal use of hydrostatic air bearings such as at 8, 9, 10 and 11 of the well-known positive pressure type. A hydrodynamic air bearing 12 may also be used where the speed of the tape is sufficiently uniform as to create a stable boundary layer of air on the bearing upon which the tape can ride. This hydrodynamic bearing is also suitable where the tape does not take such a great bend as to exert excessive force on the boundary layer. Otherwise the positive pressure air bearings 8–11 are used. The tape is maintained in the several buffer columns by means of vacuum exerted through holes in the tape plate forming the tape path. For example, the first long vacuum column 2 is supplied with vacuum through a plurality of holes 13. The second vacuum column is provided with vacuum through holes 14. Vacuum is also supplied at holes 15 and 16 to define the tape path between the file reel 1 and the first long column 2, and at 17 to define the tape path after the second long column 6. The construction of the tape path is such that vacuum is also supplied, as indicated by arrows 18, and 19 to define the second isolation pocket 5, and at 20 to provide the first isolation pocket 3. Preferably the tape's actual speed past the head 4 is controlled by a capstan 21 which may be of a conventional vacuum assisted type, and which may comprise an optical sensing means for providing a tachometric signal for tape motion control. The particular advantage provided by the tape path of the invention, which comprises, as explained above, first and second reels, one disposed above the other, first and second vacuum columns, both folded over and adjacent to one another so as to provide maximum efficiency of space utilization, and first and second stubby columns, is that inter alia, the use of dual stubby columns in conjunction with dual long buffers permits the tape speeds to be higher than available in prior rack mounted tape drives of the type shown in e.g. U.S. Pat. No. 3,866,855 referred to above while still fitting into the 19 inch standard rack (this dimension being taken horizontally in FIG. 1), and providing a substantially 180° wrap around the capstan 21.

In other respects the tape drive of the invention may be relatively conventional. For example, the head area may comprise a vacuum cleaner unit for the tape as disclosed in commonly-assigned U.S. Pat. No. 3,854,674, and may additionally comprise a high speed rewind foot 22 as discussed in commonly-assigned U.S. Pat. No. 4,189,113. The tape drive of the invention may be provided with conventional means for automatic threading of the tape and means 23 for automatic opening of the cartridges in which tapes are commonly supplied. Similarly, large numbers of holes 24 and 25 (in a preferred embodiment, 55 holes are provided at both 24 and 25) to allow the sensing of the location of loops 26 and 27 of tape in the long buffer columns 6 and 2 respectively at any given time, thus permitting control of the speeds of the two reels 1 and 7, each of which are, in a presently preferred 125 ips version of the drive, separately servo-driven, so as to enable uniform and stable operation of the tape drive according to the invention. Loop-out sensor holes 42–45 are also provided; if the loops of tape 26, 27 pass these holes, failure is indicated, and the microprocessor shuts the machine down. It will also be understood that a cover (not shown), preferably transparent, must be used to substantially seal the long buffers 2 and 6 and the isolation pockets 3 and 5 from the atmosphere. Another possibility which has been of use is to provide fence posts 28, 29, 30 and 31 in the tape path to prevent the tape from adhering to the long walls of the columns at any point and causing high frictional drag on the apparatus. Another expedient which is useful in this connection is to coat the walls of the columns with a glass beaded tape of well-known type to which the tape is unlikely to adhere.

Figure 2:
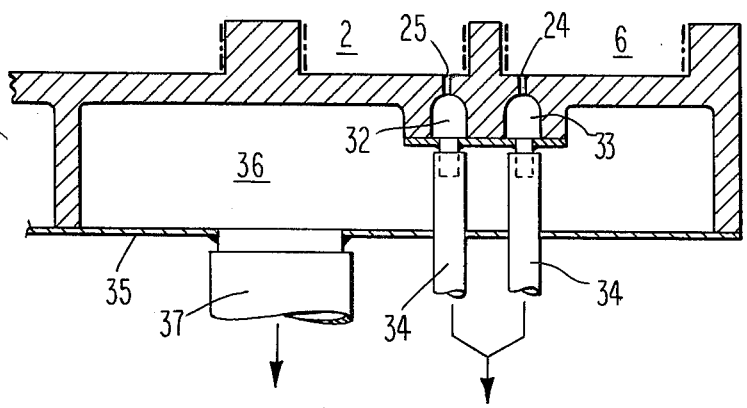
FIG. 2 represents a cross-section taken along line 2—2 of FIG. 1.

Referring now to FIG. 2, which is a cross-sectional view taken along the view 2—2 of FIG. 1, it is seen how the plurality of holes 4 and 25 are connected to respective plenums 33 and 32 in turn connected to hoses 34. Since vacuum is supplied to one side of the tape loops within each of the two long columns 2 and 6, connecting vacuum sensors to tubes 34 provides signals indicative of the location of the loops within the long columns 2 and 6 since the other side of those loops will be exposed to atmospheric pressure. Therefore, by monitoring the pressure in the tubes 34, the location of the loops within the long columns can be monitored and signals can be derived therefrom and used to control the apparatus.

It will also be seen from FIG. 2 how a plate 35 can be placed across the back of the casting to form a large plenum 36. All the vacuum sources 13, 14, 15, 16, 17 and 20 as well as the vacuum capstan 21 can be connected in common to this large plenum for control of the tape's motion. In the presently preferred embodiment a vacuum of approximately 41 inches of water is used.

The loop-out sensor holes (FIG. 1) are piped through the large plenum 36 and monitored similarly to plenums 32 and 33, that is, under normal conditions pressure sensors connected to holes 42 and 44 will sense the vacuum, while sensors connected to holes 43 and 45 will sense atmospheric pressure. Variation from these norms indicates that one of the loops of tape 26 and 27 have passed the sensor holes, and is used as a signal of machine failure.

Figure 3:
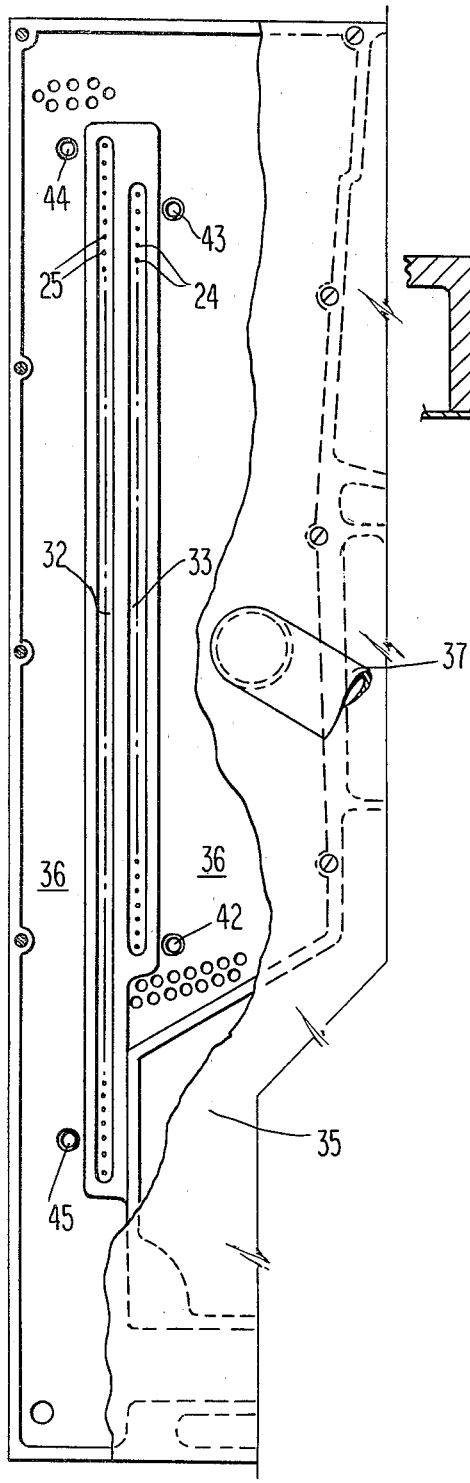
FIG. 3 represents a partial rear view of the deck casting.

FIG. 3 shows a rear view of the tape drive of the invention with the plate 35 shown partially broken away to make the construction of the long plenums 32 and 33 more clear. It will be observed that the plenum 36 which is the main vacuum area chamber is quite large, which permits a large quantity of vacuum to be drawn at all times so as to provide a sort of vacuum buffer whereby fluctuations in the vacuum are eliminated and the tape transport is accordingly made more stable. This large quantity of vacuum can be exerted by, e.g., a hose 37 connected to a fitting on the back of the plate 35.

Figure 4:
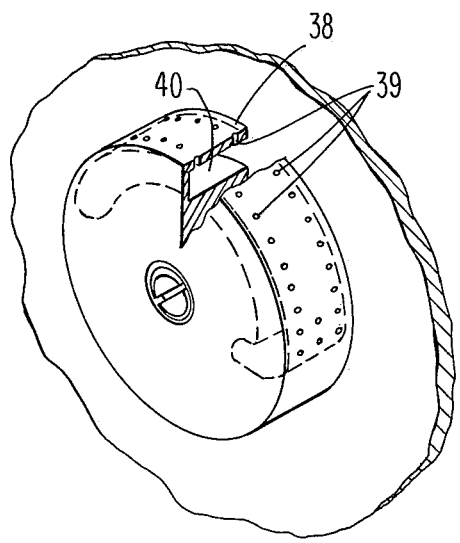
FIG. 4 is an enlarged perspective view of an air bearing used in the practice of the invention.

A detail of one of the air bearings which might be, e.g., air bearing 8 is shown as FIG. 4. The air bearing may comprise a cylinder 38 having an inner plenum chamber 40 communicating with a plurality of relatively small holes 39 through which air pressure is exerted by means of a fitting communicating with the plenum 40. Thus, air pressure on a segment of tape prevents the tape from coming into contact with the surface of the cylinder 38. In a presently preferred embodiment the pressure supplied is typically equal to 71 inches of water.

Figure 5:
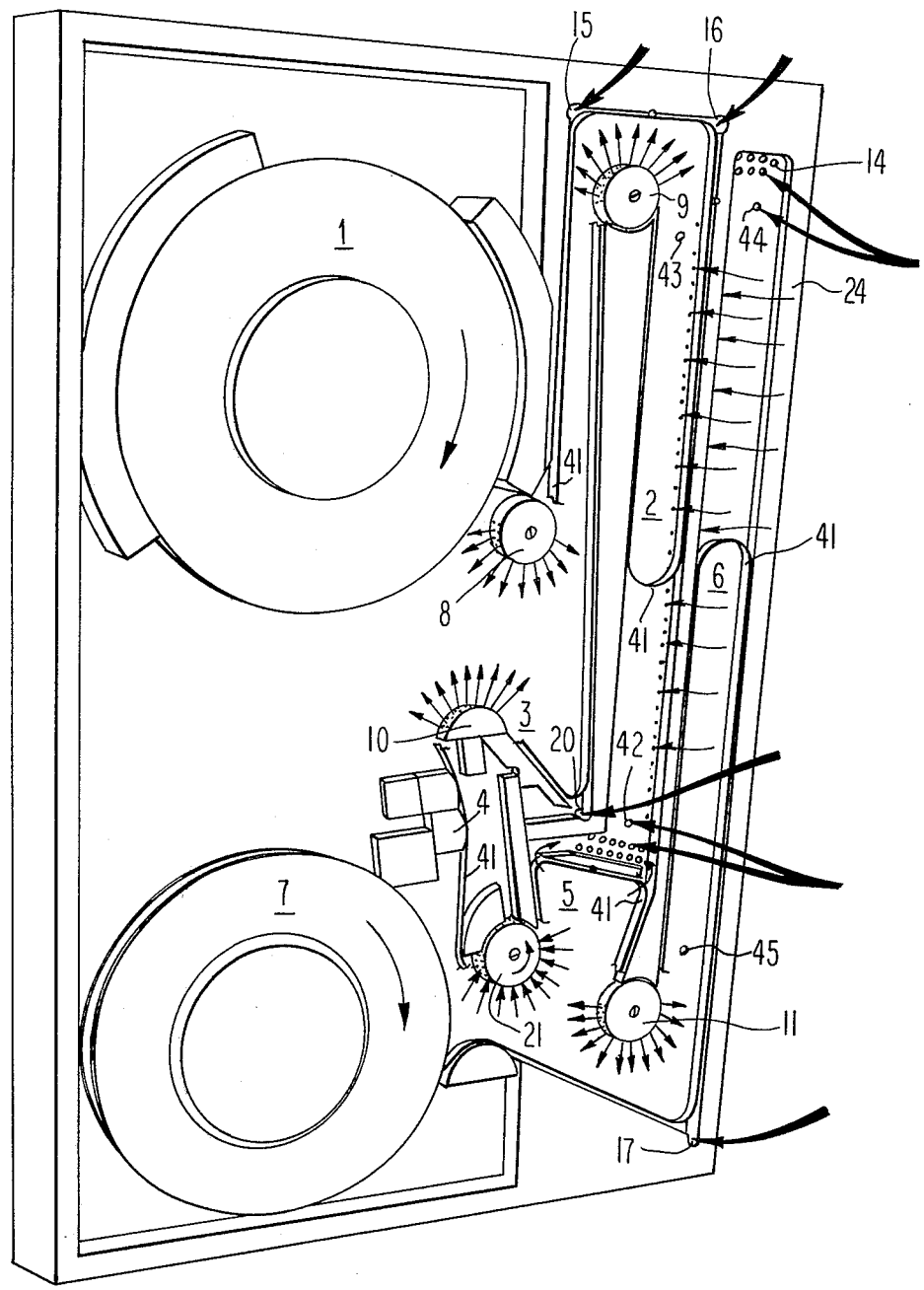
FIG. 5 is a perspective view showing the sources of vacuum and of pressure and tape path in greater detail than in other views.

Referring now to FIG. 5, a perspective view is shown of the tape drive of the invention which shows, by means of arrows, the locations at which air pressure or a vacuum is exerted. Air pressure, shown by outward arrows is exerted at the four air bearings 8, 9, 10 and 11 while vacuum (inward arrows) is exerted via holes 13, 14, 15, 16, 17 and 20 as well as at the capstan 21. As shown, the vacuum and pressure define the tape path comprising the two reels 1 and 7 as well as the two columns 2 and 6, the two isolation pockets 3 and 5 and the tape head 4. The tape 41 is shown in the locations where no pressure or vacuum is exerted.

It will be appreciated by those skilled in the art that the use of dual folded-over columns in conjunction with the two small isolation pockets, permits the longest effective possible column length (i.e. the maximum mass decoupling) within the 19 inch rack size, consistent with speed and power requirements so as to be competitive with horizontally opposed reel type tape drives which are more bulky. Moreover, the double isolation pocket configuration provides for substantially 180° capstan wrap for increased accuracy and higher tape acceleration. The particular geometry chosen for the isolation pockets, the V of the first isolation pocket 3 and the narrow opening-wider bottom of the second isolation pocket 5 is chosen to expose the proper amount of tape to vacuum at all times so that the force exerted on the tape is balanced by the amount of the tape exposed to the vacuum, that is, the loops of tape within the isolation pockets and vacuum columns is automatically self-adjusting until the force exerted on the several loops is equal. It will be noted that the vacuum exerted on the lower isolation pocket 5 is exerted by means of the holes 13 which thus perform double duty inasmuch as they also supply vacuum to the first long column 2, thus simplifying the construction of the tape unit according to the invention.

The above description of the preferred embodiment of the invention is sufficient to enable one skilled in the art to comprehend and practice the invention. For additional detailed information not critical to such understanding of the invention, reference is made to the "195X Tape Unit Field Engineering Maintenance Manual, PN 9360", published by Storage Technology Corporation, assignee of the present invention, and hereby incorporated herein by reference.

It will therefore be appreciated that there are numerous improvements and modifications which can be made in the system of the invention but which are within its scope, as it is defined by the following claims.

What is claimed is:

1. Apparatus for storing data on magnetic tape, comprising supply reel means, take-up reel means disposed substantially vertically with respect to said supply reel means, magnetic read/write head means, a drive capstan for controlling the motion of said tape with respect to said head means, and means for establishing a tape path connecting said supply reel means with said take-up reel means, said head means being disposed therebetween, said path comprising a first vertically disposed vacuum chamber open at its upper end and a second vacuum chamber open at its lower end, said vacuum chambers being located adjacent one another, and first and second isolation pockets defined by walls disposed on opposing sides of said head means, at least one of said isolation pockets comprising at least two vacuum sources located in proximity to intersections of walls defining said pocket, at least one of said intersections of walls forming an angle greater than 90° and another of said intersections of walls forming an angle of at least 90°, whereby said path changes direction by more than 180° in said pocket.

2. The apparatus of claim 1 where said path comprises a wrap around said capstan of at least substantially 180°.

3. The apparatus of claim 1 wherein said capstan comprises vacuum assist means to prevent slippage of said tape with respect to said capstan.

4. The apparatus of claim 1 wherein said capstan comprises means for providing a signal indicative of rotation undergone by said capstan.

5. The apparatus of claim 1 further comprising hydrostatic air bearing means for supporting said tape in the vicinity of said isolation pockets.

6. In a magnetic tape drive comprising a supply reel hub and take-up reel hub rotating about spaced parallel axes disposed one above the other, two vertical vacuum chambers, one having an opening in the top thereof and the other having an opening in the bottom thereof, for accommodating a slack loop of the tape, and a tape head mounted in the tape path between said hubs, the improvement which comprises said drive further comprising first and second isolation pockets disposed on either side of said tape head, said pockets comprising vacuum sources and walls defining said path, at least one of said pockets changing the direction of said path by more than 180°, said path in said pocket being controlled by plural vacuum sources in said pocket.

7. The drive of claim 6 wherein said isolation pockets open in directions substantially perpendicular to the plane of said head and are directed away from a line through the center of said head whereby the tape engages guide means on either side of said head for at least substantially 180°.

8. The drive of claim 7 wherein said guide means comprises a capstan.

9. The drive of claim 6 comprising a vacuum-assisted drive capstan.

10. The drive of either claims 8 or 9 wherein said capstan comprises tachometer means for producing a signal from which an indication of movement of said tape may be produced.

* * * * *